United States Patent [19]

Shtarkman

[11] Patent Number: 4,896,752
[45] Date of Patent: Jan. 30, 1990

[54] VEHICLE STRUT

[75] Inventor: Emil M. Shtarkman, Southfield, Mich.

[73] Assignee: TRW Inc., Lyndhurst, Ohio

[21] Appl. No.: 155,620

[22] Filed: Feb. 12, 1988

[51] Int. Cl.$^4$ ............................................. F16F 13/00
[52] U.S. Cl. ................................... 188/299; 188/267;
188/315; 188/318; 267/64.26; 267/64.27; 267/140.1
[58] Field of Search ............... 188/299, 298, 297, 313, 188/314, 315, 316, 317, 318, 267, 268; 267/146.1, 217, 218, 219, 64.23, 64.26, 64.27

[56] References Cited

U.S. PATENT DOCUMENTS

| | | | |
|---|---|---|---|
| 2,802,664 | 8/1957 | Jackson | 267/64.19 |
| 2,940,749 | 6/1960 | Kemelhor | 267/127 |
| 3,033,556 | 5/1962 | Wossner | 267/64.19 |
| 3,042,393 | 7/1962 | Heiss et al. | 267/35 |
| 3,174,587 | 3/1965 | Walton | 188/267 |
| 3,221,849 | 12/1965 | Klass et al. | 192/21.5 |
| 3,416,549 | 12/1968 | Chaney et al. | 137/827 |
| 3,658,314 | 4/1972 | Luzsicza | 267/121 |
| 3,770,258 | 11/1973 | Takahashi et al. | 267/35 |
| 3,955,807 | 5/1976 | Takahashi et al. | 267/64.23 |
| 4,234,172 | 11/1980 | Takahashi | 267/220 |
| 4,364,582 | 12/1982 | Takahashi et al. | 28/698 |
| 4,401,298 | 8/1983 | Eaton et al. | 267/140.1 |
| 4,469,315 | 9/1984 | Nicholls et al. | 267/64.17 |
| 4,546,960 | 10/1985 | Abrams et al. | 267/136 |
| 4,560,150 | 12/1985 | Shtarkman | 267/140.1 |
| 4,576,258 | 3/1986 | Spisak et al. | 188/299 |
| 4,605,244 | 8/1986 | Tanaka et al. | 280/707 |
| 4,733,758 | 3/1988 | Duclos et al. | 188/267 |
| 4,742,998 | 5/1988 | Schubert | 267/140.1 |
| 4,749,069 | 7/1988 | Knecht et al. | 188/317 |
| 4,759,534 | 7/1988 | Hartel | 188/268 |

FOREIGN PATENT DOCUMENTS

| | | | |
|---|---|---|---|
| 0008807 | 1/1987 | Japan | 188/299 |
| 2111171 | 6/1983 | United Kingdom | |

OTHER PUBLICATIONS

Kawagoe, et al., "Journal of Japanese Society of Automotive Engineers", Aug. 1985.
Bender, "Report at Proceedings of Acoustic Society of America".

*Primary Examiner*—Robert J. Oberleitner
*Assistant Examiner*—Matthew C. Graham
*Attorney, Agent, or Firm*—Tarolli, Sundheim & Covell

[57] ABSTRACT

A vehicle strut includes a cylinder and a piston connected to a piston rod axially movable within the cylinder. The strut further includes two elastomeric spring members at opposite ends of the strut defining respective fluid chambers. A connecting member connects the two elastomeric spring members. The spring rate of one elastomeric spring member is different from the other elastomeric spring member. An electroheological fluid is disposed within the fluid chambers. An elastomeric bladder separates one of the fluid chambers from a gas chamber. The fluid chambers are in fluid communication with a fluid storage chamber located in the central portion of the strut. Another elastomeric bladder separates the fluid storage chamber from another gas chamber. When relative movement occurs between the cylinder and the piston rod, the elastomeric spring members either axially deform or stretch depending upon the direction of relative movement, the fluid flows between the fluid chambers and the fluid storage chamber, and the gas chambers compress or expand to damp and absorb the energy of the relative movement. A variable electric fluid is applied across the electrorheological fluid to control its viscosity and thereby further control the spring and damping characteristics of the strut.

23 Claims, 6 Drawing Sheets

VEHICLE STRUT

BACKGROUND OF THE INVENTION

1. Technical Field

The present invention relates to a strut for use in a suspension system, and particularly relates to controlling the spring and the damping characteristics of a vehicle strut.

2. Background Art

A multitude of struts for use in suspension systems are known in the art. Some struts use pressurized air or gas to dampen relative movement between parts. Other struts use elastomeric spring assemblies defining liquid chambers to provide the damping. Some struts include a combination of elastomeric spring assemblies, pressurized gas, and pressurized liquid. Certain known struts attempt to provide high deflection, a soft spring rate, and maximum load carrying capacity.

A known vehicle strut is disclosed in U.S. Pat. No. 3,658,314. The strut of U.S. Pat. No. 3,658,314 combines the functions of a vehicle shock absorber and a vehicle compression spring. In one embodiment of U.S. Pat. No. 3,658,314 shown in FIG. 7, the strut includes an inner tubular member and an outer tubular member which is coaxial with the inner tubular member. Each tubular member defines a respective fluid chamber having fluid contained therein. A valving member divides the fluid chamber associated with the outer tubular member into two chamber portions. Orifices allow fluid flow between the fluid chamber associated with the inner tubular member and one portion of the fluid chamber associated with the outer tubular member. The strut further includes two elastomeric spring members which are serially arranged along the longitudinal central axis of the strut. Each elastomeric spring has a different spring rate. One elastomeric spring is secured to and between the inner tubular member and the outer tubular member. The other elastomeric spring is secured to the outer tubular member and an adjacent support.

When relative movement occurs between the inner tubular member and the outer tubular member, the elastomeric spring between the tubular members compresses or expands depending upon the direction of relative movement of the tubular members. This causes fluid flow between the different fluid chambers through the orifices. A fluid flow is also established between the two chamber portions associated with the outer tubular member through the valving member. The volumetric relationship between the different fluid chambers changes when these fluid flows are established. The result is that the energy of the relative movement between the two tubular members is absorbed and damped.

Another vehicle strut is disclosed in U.S. Pat. No. 3,955,807. The strut of U.S. Pat. No. 3,955,807 includes a cylinder and a piston axially movable within the cylinder. The cylinder and the piston define first and second fluid chambers in fluid communication with each other. The strut further includes a spring unit having a pneumatic spring chamber and a third fluid chamber in fluid communication with the first fluid chamber. An elastomeric diaphragm separates the pneumatic spring chamber and the third fluid chamber. A disc-shaped elastomeric spring is disposed within the third fluid chamber.

When a compression load is applied to the strut, the cylinder and the piston move relative to each other. The fluid pressure in all three fluid chambers increases. When the fluid pressure in the third fluid chamber increases above a predetermined amount, both the elastomeric diaphragm and the elastomeric spring deform in response thereto. The elastomeric diaphragm compresses against the pressure in the pneumatic spring chamber to damp and absorb the energy of the compression load.

SUMMARY OF THE INVENTION

The present invention is directed to a strut for use in a suspension system. The strut includes a plurality of springs acting in concert to provide high deflection, a soft spring rate, and maximum load carrying capacity. The strut of the present invention is particularly suitable for use in a vehicle suspension system.

In a preferred embodiment of the present invention, the strut is connectable between relatively movable vehicle parts. The strut includes a cylinder and a piston concentric with and axially movable within the cylinder. The strut further includes two elastomeric spring members. Each spring member is ring-shaped and has a spring rate different from the other spring member. Each spring member extends at an angle to the direction of relative movement of the vehicle parts One spring member defines a first fluid chamber and the other spring member defines a second fluid chamber.

The first and second fluid chambers are in fluid communication with a fluid storage chamber through a plurality of fluid passages. A first elastomeric bladder separates the first fluid chamber from a first gas chamber. A second elastomeric bladder separates the storage chamber from a second gas chamber.

When relative movement occurs between the vehicle parts, the two spring members move. The two spring members are either squeezed and deformed axially or stretched, depending upon the direction of relative movement. At the same time, fluid flows between the storage chamber and the first and second fluid chambers to either compress or expand the first and second gas chambers, depending upon the direction of relative movement. Fluid flow into the first fluid chamber compresses the first gas chamber, while fluid flow out of the first fluid chamber expands the first gas chamber. Fluid flow into the storage chamber compresses the second gas chamber, while fluid flow out of the storage chamber expands the second gas chamber The movement of the spring members, the fluid flows between the two fluid chambers and the storage chamber, the compression or expansion of the first gas chamber, and the compression or expansion of the second gas chamber result in damping and absorption of the energy of the relative movement between the vehicle parts.

An electrorheological fluid is disposed within the fluid chambers. A plurality of conductive rings connectable to an electrical power source is disposed in the flow path between the first fluid chamber and the storage chamber. If the conductive rings are connected to the electrical power source, then an electric field is applied across the fluid in the vicinity of the conductive rings. The viscosity of the electrorheological fluid varies as a function of the magnitude of the electric field applied to the fluid. When the viscosity of the fluid is varied, the spring rate of one spring member is varied. As the viscosity of the fluid increases, the damping provided by the strut increases. Likewise, the damping decreases when the viscosity of the fluid decreases.

Thus, the spring and damping characteristics of the strut are variable and controllable in response to the applied electric field.

During a compression stroke, the two elastomeric spring members deform axially to damp and absorb the energy of the relative movement. Each spring member has a different spring rate, and extends at an angle to the direction of relative movement. Also, each spring member moves over center if the compression stroke is of a sufficient magnitude. A spring member is at its maximum resistance to relative movement of the two vehicle parts just prior to moving over center. After a spring member moves over center, the resistance of the spring to the relative movement of the two vehicle parts decreases.

In accordance with one feature of the present invention, an apparatus is provided for damping relative movement between parts. The apparatus includes an elastomeric spring assembly acting to resist relative movement between the parts. The elastomeric spring assembly includes an elastomeric spring member defining in part a first fluid chamber. The apparatus further includes means defining a fluid storage chamber in fluid communication with the first fluid chamber Means is provided for controlling fluid flow from the first fluid chamber to the fluid storage chamber to thereby control the spring rate of the elastomeric spring. Sensor means is provided for sensing a condition to be encountered by the parts for controlling the means for controlling fluid flow from the first fluid chamber to the fluid storage chamber In the preferred embodiment of the present invention, the sensor means comprises remote sensors for providing electrical signals indicative of road conditions to be encountered by the vehicle These electrical signals may also include indications of vehicle acceleration, vehicle speed, or brake system pressure In accordance with another feature of the present invention, a strut is provided for damping relative movement between parts. The strut includes first and second elastomeric springs acting to resist relative movement between the parts. The first and second elastomeric springs have different spring rates The respective elastomeric springs define in part respective first and second fluid chambers. The strut further includes means for connecting the first and second elastomeric springs to act in series. A cylinder is connected with one of the parts and with one of the elastomeric springs and defines a working fluid chamber in fluid communication with the first and second fluid chambers. A piston divides the working chamber into first and second working fluid chambers A piston rod is connected with the piston and with the other of the part and with the other of the elastomeric springs. The piston and the piston rod are movable relative to the cylinder in compression and extension strokes.

In accordance with still another feature of the present invention, a suspension strut is provided for damping relative movement between parts. The strut includes a cylinder connected with one of the parts and defining a working fluid chamber. The strut further includes a piston dividing the working fluid chamber into first and second chamber portions The piston is connected with the other of the parts and is movable relative to the cylinder in compression and extension strokes. The strut further includes first and second elastomeric spring assemblies acting to resist relative movement between the piston and the cylinder. Each of the elastomeric spring assemblies comprises a respective elastomeric spring member defining in part a respective fluid chamber. The strut further includes means forming a chamber around the cylinder and a flexible elastomeric membrane dividing the chamber into a fluid storage compartment for receiving fluid therein and a gas compartment for receiving a gaseous medium under pressure. The strut further includes means for providing fluid communication between fluid chambers defined by the elastomeric members and the fluid storage compartment.

BRIEF DESCRIPTION OF THE DRAWINGS

The foregoing and other features and advantages of the present invention will become apparent to one skilled in the art to which the present invention relates from reading the following description of a preferred embodiment in conjunction with the accompanying drawings, wherein.

DESCRIPTION OF A PREFERRED EMBODIMENT

Figure 1:
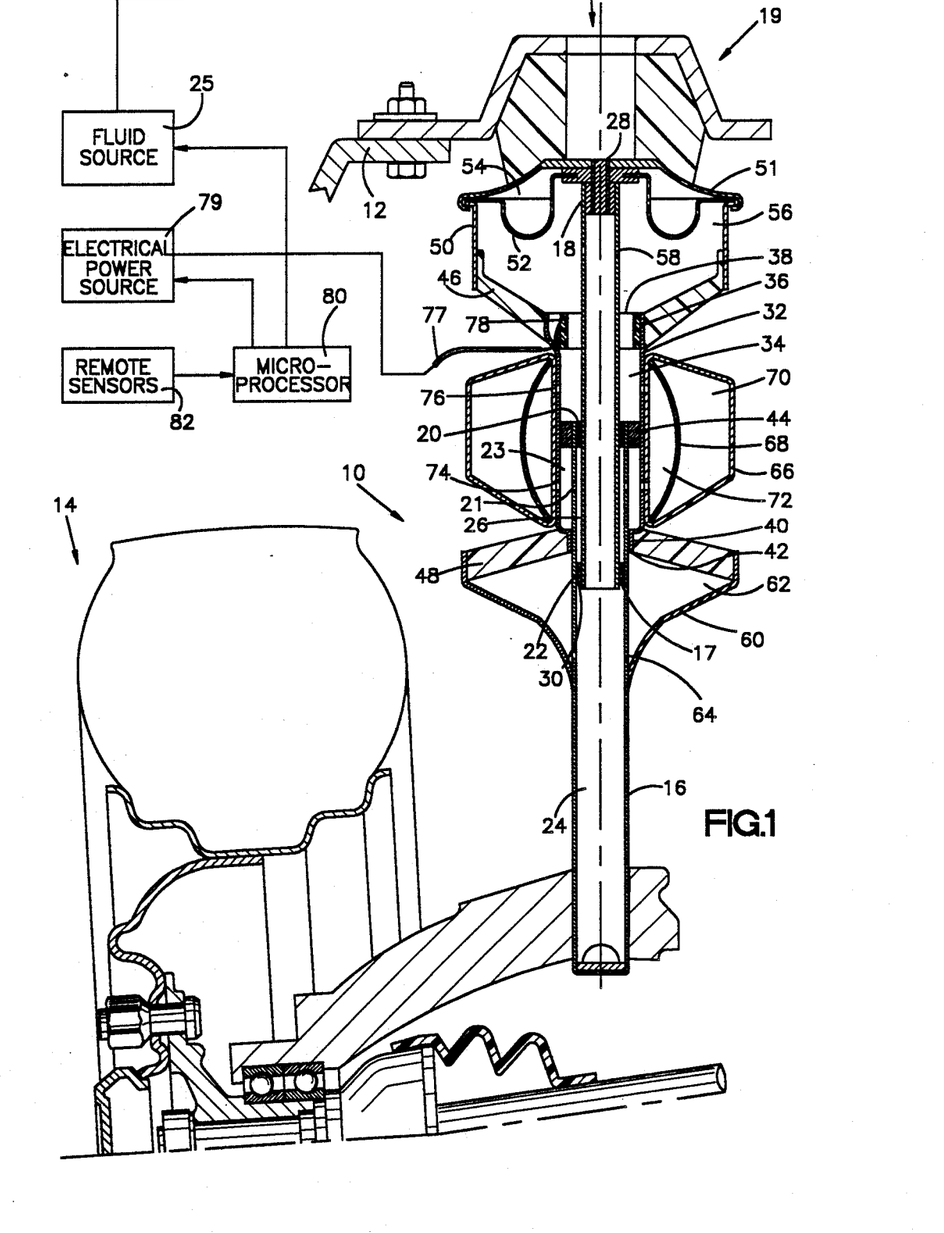
FIG. 1 is a schematic illustration of a vehicle strut connected between a vehicle body and a vehicle wheel and constructed in accordance with the present invention.

The present invention relates to an apparatus for damping relative movement between parts. The specific construction and use of the apparatus may vary. As an example, the present invention is illustrated in FIG. 1 as embodied in a strut 10 for use in a vehicle suspension system.

The strut 10 is connected between a frame part 12 of a vehicle and a wheel assembly 14 of the vehicle. The strut 10 includes a cylinder 16 and a piston 17 connected to a hollow piston rod 18. The piston rod 18 telescopically extends into the cylinder 16. The cylinder 16 is connected to the wheel assembly 14. The piston rod 18 is connected to the frame part 12 through a strut mounting assembly 19.

Figure 2:
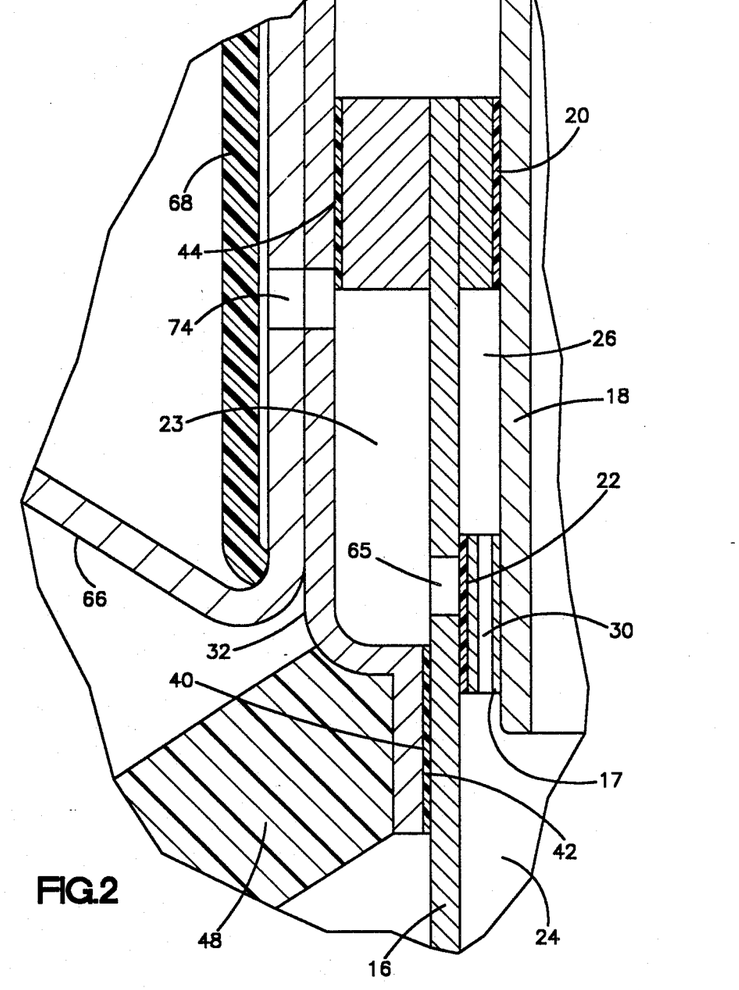
FIG. 2 is an enlarged view of a portion of the vehicle strut of FIG. 1.

A bearing 20 (FIGS. 1 and 2) made of Teflon or any other suitable material is attached to one end of the cylinder 16. A bearing 22 made of a Teflon material is connected to the piston 17. The two bearings 20, 22 guide relative axial movement of the cylinder 16 and piston 17.

The cylinder 16 defines a working fluid chamber. The piston 17 divides the working fluid chamber into two fluid chambers 24, 26. The piston 17 includes a fluid passage 30 which provides fluid communication between the fluid chamber 24 and the fluid chamber 26. The fluid chamber 24 (FIG. 1) is in fluid communication with a fluid source 25 through a fluid passage 28 in the upper end of the strut and the hollow piston rod 18.

The strut 10 further includes a connecting member 32 encircling and coaxial with the first cylinder 16. The cylinder 16 and the member 32 define a fluid chamber 34. One end of the member 32 defines a first hub 36 concentric and coaxial with the cylinder 16. The interior surface of the first hub 36 defines a fluid passage 38. The other end of the cylinder 32 defines a second hub 40 concentric and coaxial with the cylinder 16.

A bearing 42 (FIGS. 1 and 2) made of a Teflon material establishes a fixed radial relationship between the cylinder 16 and the member 32. The bearing 42 on the second hub 40 allows for sliding movement between the cylinder 16 and the member 32. In the central portion of the member 32, a bearing 44 made of a Teflon material encircles one end of the cylinder 16. The bearing 44 establishes a fixed radial relationship between the cylinder 16 and the member 32. The cylinder 16 and the member 32 define a fluid chamber 23 which is in fluid communication with the fluid chamber 26 through a fluid passage 21 in the cylinder 16.

The strut 10 (FIG. 1) further includes a first elastomeric spring 46 and a second elastomeric spring 48. Each spring encircles and is coaxial with the piston rod 18, the cylinder 16, and the member 32. Each spring is ring-shaped and extends at an angle to the direction of relative movement of the piston 17 and the cylinder 16. The inner diameter of the first spring 46 is fastened mechanically or by chemical bonding to the first hub 36 of the member 32 in a manner to provide fluid sealing engagement. The outer periphery of the first spring 46 is fastened mechanically or by chemical bonding to a first housing 50 in a manner to provide fluid sealing engagement.

The first housing 50 and the first spring 46 define a chamber. A first elastomeric bladder 52 is arranged within this chamber to divide it into two chamber portions 54, 56. One chamber portion 54 is a first gas chamber defined by the first bladder 52 and a cap section 51 fastened to the first housing 50. The cap section 51 is fixedly secured to the strut mounting assembly 19. The other chamber portion 56 is a fluid chamber defined by the first housing 50, the first bladder 52, and the first spring 46. The fluid chamber 56 is in fluid communication with the fluid chamber 24 through a fluid passage 58 in the piston rod 18. The fluid chamber 56 is also in fluid communication with the fluid chamber 34 through the fluid passage 38.

The inner diameter of the second spring 48 is fastened mechanically or by chemical bonding to the second hub 40 of the member 32 in a manner to provide fluid sealing engagement. The outer periphery of the second spring 48 is fastened mechanically or by chemical bonding to a second housing 60 in a manner to provide fluid sealing engagement. The second housing 60 and the second spring 48 define a fluid chamber 62 which is in fluid communication with the fluid chamber 24 through a fluid passage 64 in the cylinder 16.

The strut 10 further includes a third housing 66 located at the central portion of the strut 10. The third housing 66 is fixedly secured to the member 32. A second elastomeric bladder 68 divides the third housing 66 into two chambers 70, 72. The chamber 70 is a second gas chamber defined by the second bladder 68 and the outer wall of the third housing 66. The chamber 72 is a fluid storage chamber defined by the second bladder 68 and the inner wall of the third housing 66. The storage chamber 72 is in fluid communication with the fluid chamber 23 through a fluid passage 74 in the third housing 66 and the member 32. The storage chamber 72 is also in fluid communication with the fluid chamber 34 through a fluid passage 76 in the third housing 66 and the member 32.

A plurality of conductive rings 78 is disposed on the inner wall of the first hub 36 in a side-by-side relationship. The conductive rings 78 are electrically insulated from each other and from the first hub 36. The conductive rings 78 are electrically connectable to the positive terminal of an electrical energy source 79 through an electrical connection 77. The negative terminal of the electrical energy source 79 is electrically connected to the piston rod 18 through another electrical connection (not shown).

The conductive rings 78 and the piston rod 18 form two electrodes. When the conductive rings 78 are electrically connected to the electrical energy source 79, a voltage potential is established between the conductive rings 78 and the piston rod 18 creating an electric field. An electrorheological fluid is disposed in the fluid chambers 23, 24, 26, 34, 56, 62, 72 and the fluid passages 21, 28, 30, 38, 58, 64, 74, 76 of the strut 10. The electric field acts on the electrorheological fluid in the fluid passage 38. This electric field is directly proportional to the voltage applied to the electrodes (conductive rings 78 and piston rod 18) and the length of the electrodes.

The effective lengths of the two electrodes are varied by varying the number of conductive rings to which the voltage from the electrical energy source 79 is applied. The viscosity of the electrorheological fluid is directly proportional to the electric field applied across the fluid. Thus, when either the voltage from the electrical energy source 79 is varied or the number of energized conductive rings 78 is varied, the viscosity of the electrorheological fluid is varied.

When the viscosity of the electrorheological fluid increases, the rate of fluid flow through the fluid passage 38 decreases. Likewise, when the viscosity of the electrorheological fluid decreases, the rate of fluid flow through the fluid passage 38 increases. Controlling the viscosity of the electrorheological fluid is effectively controlling a valve in the fluid passage 38. The damping rate of the strut 10 varies when the rate of fluid flow through the fluid passage 38 varies. The damping rate of the strut 10 varies as a function of the viscosity of the fluid located in the fluid passage 38. Thus, the use of the electrorheological fluid in combination with the conductive rings 78 provides a strut with a variable damping rate.

A microprocessor 80 controls the electrical energy source 79 and the fluid source 25 in response to signals received from remote sensors 82. The remote sensors provide electrical signals indicative of road conditions such as a chuckhole, a rock on the road, etc. to be encountered by the vehicle. The signals may also include indications of vehicle acceleration, vehicle speed, or brake system pressure. In response to the signals from the remote sensors 82, the microprocessor 80 provides output signals to control the electrical energy source 79. By controlling the electrical energy source 79, the viscosity of the electrorheological fluid is controlled. The spring and damping characteristics of the strut 10 is thereby controlled. It is contemplated that it may be desirable to control the gas pressure in the first gas chamber 54 as a function of the signals from the remote sensors 82. Furthermore, it may be desirable to control the gas pressure in the second gas chamber 70 in the same manner The operation of the strut 10 should be clear from the above. However, the operation will be described in detail hereinbelow. The parts of the strut 10 are shown in FIG. 1 in an initial position with the frame part 12 and the wheel assembly 14 in normal or desired relative positions. The piston rod 18 and the cylinder 16 are relatively movable in compression or extension strokes to damp relative movement between the frame part 12 and the wheel assembly 14. The piston rod 18 and the cylinder 16 move relatively in a compression stroke when the parts move toward each other The piston rod 18 and the cylinder 16 move relatively in an extension stroke when the parts move away from each other. The two springs 46, 48 yieldingly resist relative movement of the piston rod 18 and the cylinder 16.

Figure 3:
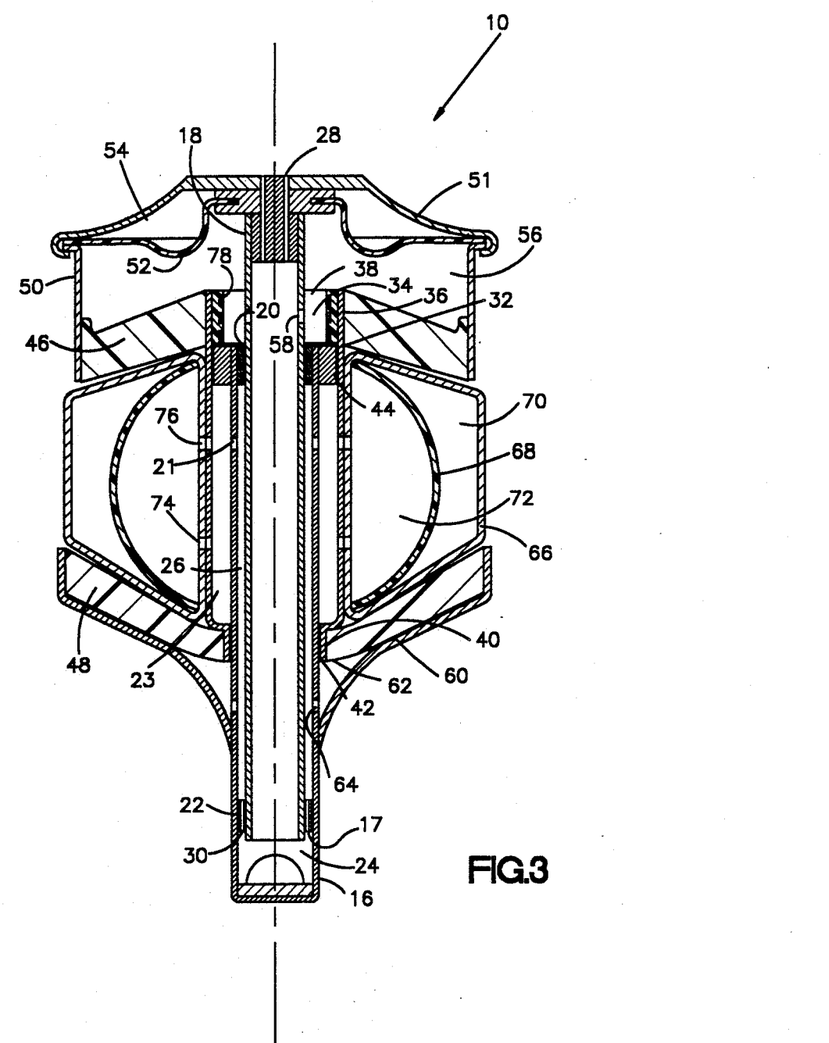
FIG. 3 is a longitudinal, cross-sectional view, illustrating the vehicle strut of FIG. 1 in a compressed condition.

During a compression stroke of the strut 10 from the condition shown in FIG. 1 to the condition shown in FIG. 3, the piston rod 18 and the cylinder 16 telescope axially toward each other. Such a compression stroke occurs if the vehicle wheel hits a rise such as a rock or the like on the road. A variety of actions occurs concurrently during the compression stroke. The wheel assembly 14 moves toward the frame part 12. Since the first housing 50 is fixedly connected to the first part 12 through the cap section 51 and the strut mounting assembly 19, the wheel assembly 14 moves toward the first housing 50. The first spring 46 is deformed axially and squeezed between the first housing 50 and the member 32.

As the first spring 46 is being squeezed and axially deformed between the first housing 50 and the member 32, the volume in the fluid chamber 56 decreases. This causes the fluid pressure in the fluid chamber 56 to increase The increased pressure in the fluid chamber 56 causes the fluid to be displaced from the fluid chamber 56 into the fluid chamber 34 through the fluid passage 38. The fluid is then displaced into the storage chamber 72 through the fluid passage 76.

The fluid in the fluid chamber 56 is also displaced into the fluid chamber 24 through the fluid passage 58. In turn, the fluid flows from the fluid chamber 24 into the fluid chamber 26 through the fluid passage 30. The fluid then flows from the fluid chamber 26 into the fluid chamber 23 through the fluid passage 21. Finally, the fluid flows from the fluid chamber 23 into the storage chamber 72 through the fluid passage 74.

While the wheel assembly 14 is moving toward the first housing 50, the third housing 60 is moving toward the frame part 12. The second spring 48 is axially deformed and squeezed between the third housing 60 and the member 32. As the second spring 48 is being squeezed and axially deformed between the third housing 60 and the member 32, the volume in the fluid chamber 62 decreases. This causes the fluid pressure in the fluid chamber 62 to increase. The fluid in the fluid chamber 62 is displaced from the fluid chamber 62 into the fluid chamber 24 through the fluid passage 64. The fluid is then displaced from the fluid chamber 24 into the fluid chamber 26 through the fluid passage 30. In turn, the fluid is displaced from the fluid chamber 26 into the storage chamber 72 through the fluid passage 74.

When fluid flows from the two fluid chambers 56, 62 into the storage chamber 72, the second bladder 68 moves against the pressure in the second gas chamber 70. The initial pressure in the second gas chamber 70 must be overcome to allow the fluid flows from the two fluid chambers 56, 62 into the storage chamber 72. Damping and resistance to relative movement of the frame part 12 and the wheel assembly 14 is provided when fluid is displaced from the two fluid chambers 56, 62 into the storage chamber 72.

Damping and resistance to relative movement is also provided by compression of the first bladder 52 against the gas pressure in the first gas chamber 54. The increased pressure in the fluid chamber 56 during the compression stroke causes the first bladder 52 to move against the gas pressure in the first gas chamber 54.

Figure 4:
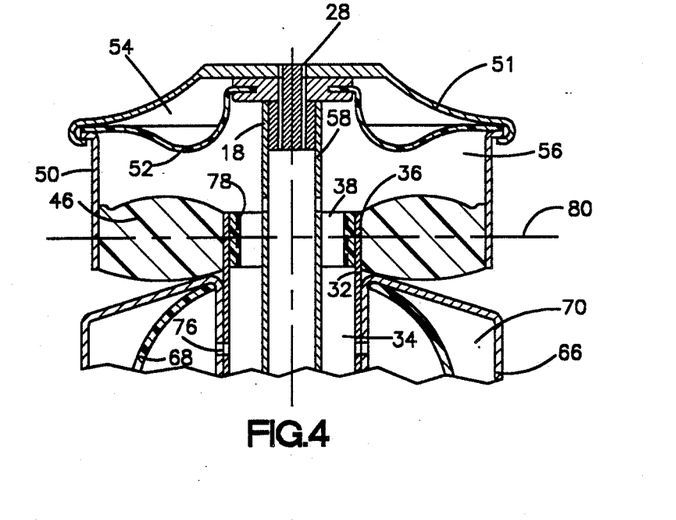
FIG. 4 is a portion of a longitudinal, cross-sectional view of the vehicle strut of FIG. 1 illustrating one elastomeric spring in a centered position.

When the first spring 46 axially deforms a first predetermined amount to the position illustrated in FIG. 4, the first spring 46 is at its center position. In its center position, a line 80 passing through the center of the ring-shaped first spring 46 lies in a plane perpendicular to the longitudinal central axis of the cylinder 16. The first spring 46 is most deformed when the first spring 46 is in its center position This deformation causes the first spring 46 to bulge as illustrated in FIG. 4. The bulge is shown exaggerated for illustrative purposes Just prior to moving over its center, the first spring 46 provides the maximum resistance to relative movement of the frame part 12 and the wheel assembly 14.

Figure 5:
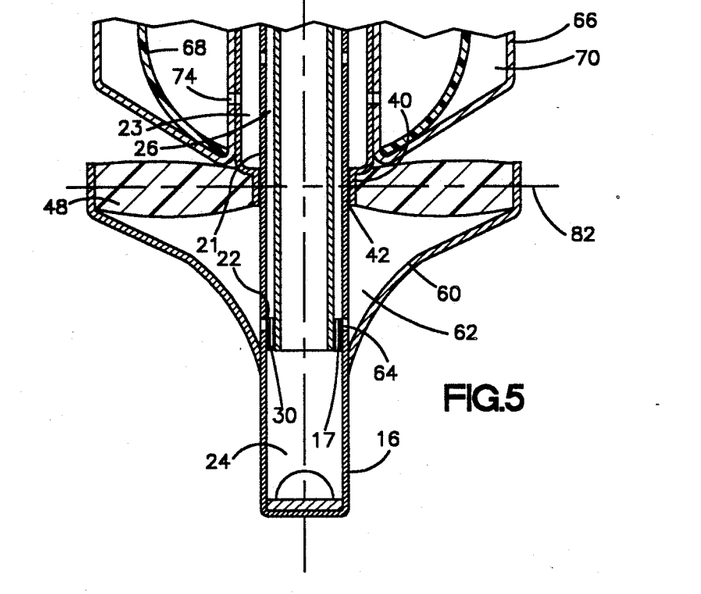
FIG. 5 is a portion of a longitudinal, cross-sectional view of the vehicle strut of FIG. 1 illustrating the other elastomeric spring in a centered position.

When the second spring 48 axially deforms a second predetermined amount to the position illustrated in FIG. 5, the second spring 48 is at its center position. In its center position, a line 82 passing through the center of the ring-shaped second spring 48 lies in a plane perpendicular to the longitudinal central axis of the cylinder 16. The second spring 48 is most deformed when the second spring 48 is in its center position This deformation causes the second spring 48 to bulge as illustrated in FIG. 5. The bulge is shown exaggerated for illustrative purposes Just prior to moving over its center, the second spring 48 provides the maximum resistance to relative movement of the frame part 12 and the wheel assembly 14.

The spring rate of the first spring 46 is less than the spring rate of the second spring 48. The distance the first spring 46 must travel before moving over its center is greater than the distance the second spring 48 must travel before moving over its center Thus, the two springs 46, 48 move over their centers at different times because of the different spring rates and the different distances the springs 46, 48 must travel. The spring rate and the travel distance of each spring are selected such that the second spring 48 moves over center before the first spring 46 moves over its center during the compression stroke After the second spring 48 moves over its center, its resistance to relative movement between the frame part 12 and the wheel assembly 14 decreases. Similarly, after the first spring 46 moves over its center, its resistance to relative movement between the frame part 12 and the wheel assembly 14 decreases. After both springs 46, 48 have moved over their centers, the strut 10 continues to compress until the strut 10 is fully compressed, as illustrated in FIG. 3 with the springs 46, 48 in contact with the third housing 66.

As noted above, while the two springs 46, 48 are axially deforming, the fluid contained in the fluid chamber 56 flows into the storage chamber 72. This flow of the electrorheological fluid during the compression stroke of the strut 10 damps relative movement of the frame part 12 and the wheel assembly 14. The fluid flow from the fluid chamber 56 into the storage chamber 72 is controlled to establish the spring and damping characteristics of the strut 10. The fluid flow from the fluid chamber 56 into the storage chamber 72 is controlled by varying the voltage potential applied to the conductive rings 78.

Fluid flows most freely between the fluid chamber 56 and the fluid chamber 34 through the fluid passage 38 when the fluid is least viscous. When this occurs, the damping provided by the strut 10 is at a minimum. As the viscosity of the fluid increases, the fluid flow between the fluid chamber 56 and the fluid chamber 34 becomes more restricted. The damping provided by the strut 10 increases. During a compression stroke an electric field is applied to the electrorheological fluid in the fluid passage 38. Thus, the fluid flow between the fluid chamber 56 and the fluid chamber 34 is restricted, and relative movement of the frame part 12 and wheel assembly 14 is damped.

During a rebound stroke of the strut 10 from the condition shown in FIG. 3 to the condition shown in FIG. 1, the piston rod 18 and the cylinder 16 telescope axially away from each other. As the strut 10 begins to extend from the fully compressed position as illustrated in FIG. 3, the volume of the fluid chamber 56 and the volume of the fluid chamber 62 begin to increase. The fluid pressure within the storage chamber 72 causes the fluid contained therein to flow into the two fluid chambers 56, 62 during the rebound stroke. The fluid flow from the storage chamber 72 into the two fluid chamber 56, 62 flows through the same fluid passages and the same fluid chambers as described hereinabove during the compression stroke. The direction of the fluid flow is simply reversed. During the rebound stroke the electric field applied to the fluid in the fluid passage 38 is maintained.

Also, during the rebound stroke, the two springs 46, 48 move over their centers. Since each spring has a different spring rate and must travel a different distance before reaching its center position, the two springs 46, 48 move over their centers at different times. The first spring 46 moves over its center before the second spring 48 moves over its center.

Figure 6:
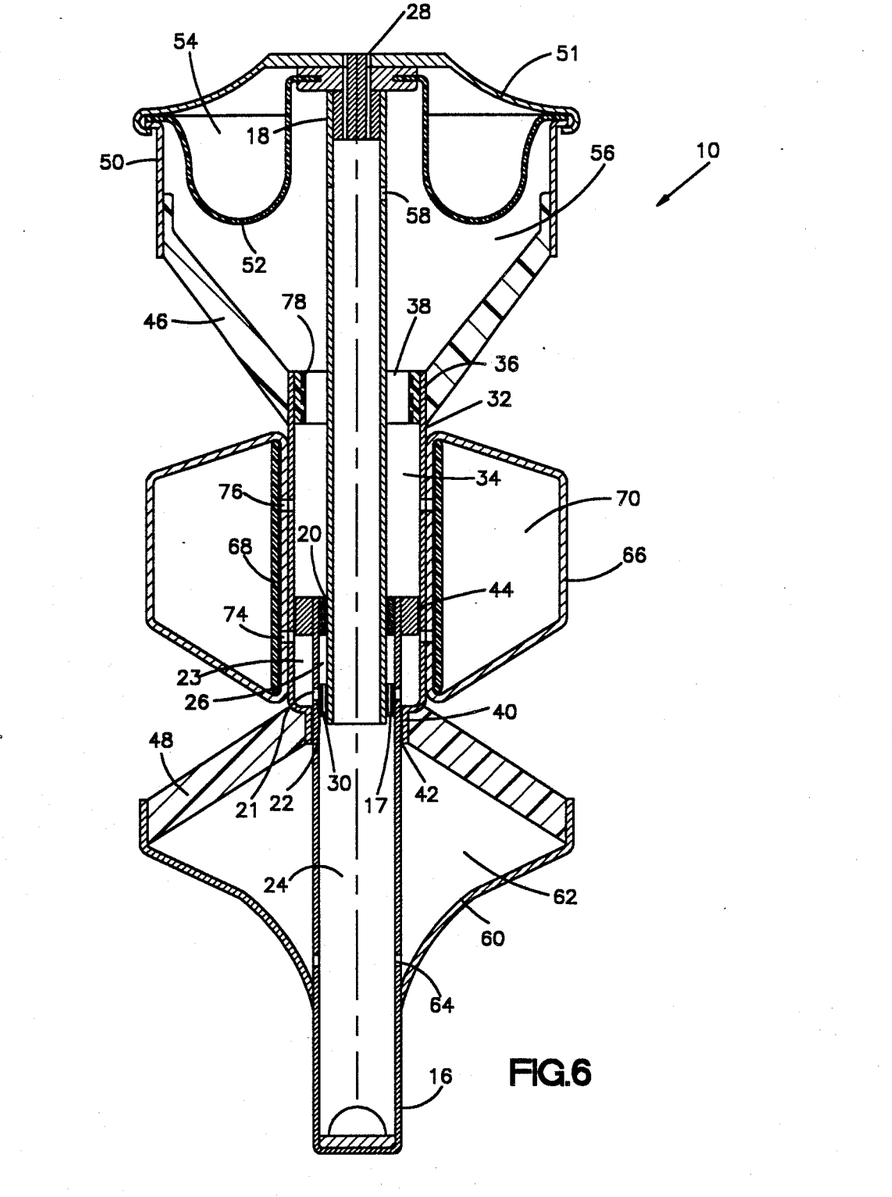
FIG. 6 is a longitudinal, cross-sectional view, illustrating the vehicle strut of FIG. 1 in an extended condition.

During an extension stroke from the condition shown in FIG. 1 to the condition shown in FIG. 6, the piston rod 18 and the cylinder 16 telescope axially away from each other. An extension stroke occurs if the vehicle wheel hits a dip such as a chuckhole or the like in the road. Again a variety of actions occurs concurrently during the extension stroke. The wheel assembly 14 moves away from the frame part 12. Since the first housing 50 is fixedly connected to the frame part 12 through the cap section 51 and the strut mounting assembly 19, the wheel assembly 14 moves away from the first housing 50. The first spring 46 stretches axially between the first housing 50 and the member 32.

As the first spring 46 stretches axially, the volume in the fluid chamber 56 increases. The fluid pressure in the fluid chamber 56 decreases The fluid pressure in the storage chamber 72 causes the fluid contained therein to flow into the fluid chamber 34 through the fluid passage 76. In turn, the fluid flows from the fluid chamber 34 into the fluid chamber 56 through the fluid passage 38.

The fluid pressure in the storage chamber 72 also causes the fluid contained therein to flow into the fluid chamber 23 through the fluid passage 74. In turn, the fluid flows from the fluid chamber 23 into the fluid chamber 26 through the fluid passage 21. The fluid then flows from the fluid chamber 26 into the fluid chamber 24 through the fluid passage 30. Finally, the fluid flows from the fluid chamber 24 into the fluid chamber 56 through the fluid passage 58.

While the wheel assembly 14 is moving away from the first housing 50, the third housing 60 is moving away from the frame part 12. The second spring 48 stretches axially between the third housing 60 and the member 32. When the second spring stretches axially, the volume in the fluid chamber 62 increases The fluid pressure in the fluid chamber 62 decreases. The fluid pressure in the storage chamber 72 causes the fluid contained therein to flow into the fluid chamber 23 through the fluid passage 74. The fluid then flows from the fluid chamber 23 into the fluid chamber 26 through the fluid passage 21. The fluid flows from the fluid chamber 26 through the fluid passage 30 into the fluid chamber 24. The fluid then flows into the fluid chamber 62 through the fluid passage 64. The storage chamber 72 is substantially empty when the strut 10 is fully extended.

Damping and resistance to relative movement of the frame part 12 and the wheel assembly 14 is provided when fluid is displaced from the storage chamber 72 into the two fluid chambers 56, 62 as well as by axial stretching of the springs 46, 48. The conductive rings 78 are energized during an extension stroke of the strut 10.

While the strut 10 is extending, the volume in the gas chamber 54 increases This occurs because of the decreasing fluid pressure in the fluid chamber 56. The higher gas pressure in the gas chamber 54 moves the first bladder 52 to allow the volume in the gas chamber 54 to increase.

During a compression stroke of the strut 10 from the condition shown in FIG. 6 to the condition shown in FIG. 1, the piston rod 18 and the cylinder 16 telescope axially toward each other. As the strut 10 begins to compress from the fully extended condition as illustrated in FIG. 6, the volume of the fluid chamber 56 and the volume of the fluid chamber 62 begin to decrease. The fluid pressure in each fluid chamber begins to increase. The increased fluid pressure in the fluid chamber 56 causes fluid contained therein to flow into the storage chamber 72 through the same fluid passages and the same fluid chambers as described hereinabove for the extension stroke. Similarly, the increased fluid pressure in the fluid chamber 62 causes fluid contained therein to flow into the storage chamber 72 through the same fluid passages and the same fluid chambers as described hereinabove. The direction of fluid flow is simply reversed.

Thus, the two springs 46, 48, the fluid pressure and the volume of fluid in the different fluid chambers at any given time define the spring rate, damping rate, ride height, and load-carrying capacity of the vehicle. By controlling the viscosity of the electrorheological fluid, both the damping and the dynamic rigidity of the strut 10 can be adjusted and adapted to any desired load condition. The series operation of the two springs 46, 48 with different spring rates, the valving action of the conductive rings 78, the pressure control of the first gas chamber 54, and the pressure control of the second gas chamber 70 provide for gradual compression or extension of the strut 10.

Figure 7:
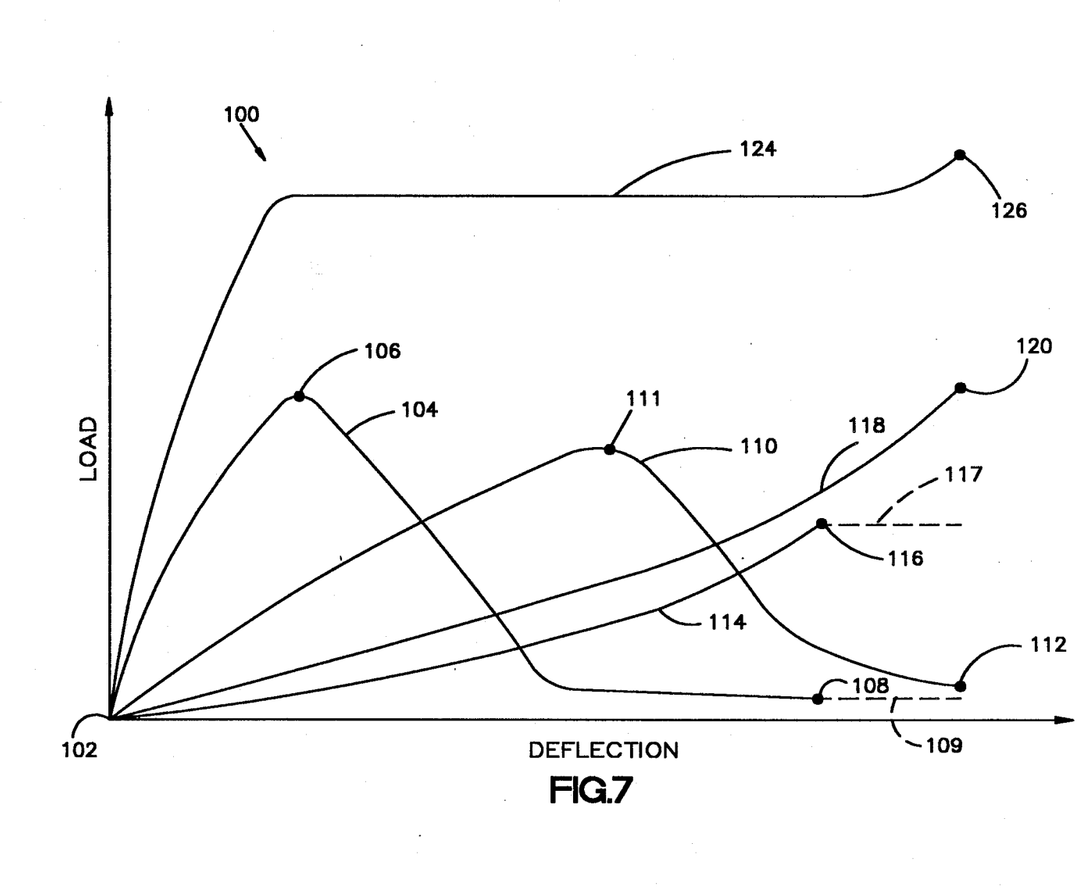
FIG. 7 is a graphical illustration of the load-deflection characteristics of the vehicle strut of FIG. 1 during a compression stroke.

Referring to FIG. 7, the operation of the strut during a compression stroke is better understood. A graph 100 illustrates the load-deflection characteristics of the strut 10 during a compression stroke. When the strut 10 is in its normal position as shown in FIG. 1, the distance between the frame part 12 and the wheel assembly is predetermined. When the wheel assembly 14 moves toward the frame part 12, the actual distance therebetween decreases. Similarly, the actual distance increases when the wheel assembly 14 moves away from the frame part 12. The amount of deflection of the strut 10 is defined as the absolute value of the difference between the actual distance the wheel assembly 14 is away from the frame part 12 and the predetermined distance when the strut 10 is in its normal position. Under a no load condition, the amount of deflection of the strut 10 is zero as indicated by point 102 and the parts are in their positions illustrated in FIG. 1.

Upon application of a compression load to the strut 10, the first spring 46 deforms. The amount of deflection of the strut 10 resulting from deformation of the first spring 46 varies as a function of the applied load. This functional relationship is represented by line 110. At point 111 on line 110, the first spring 46 is at its center position, illustrated in FIG. 4. At point 112 on line 110, the first spring 46 is at its limit of travel, as shown in FIG. 3.

During deformation of the first spring 46, the second spring 48 also deforms as represented by line 104. The second spring 48 moves over center at point 106 on line 104. At point 108 on line 104, the second spring 48 is at its limit of travel, as shown in FIG. 3. Although the second spring 48 cannot deform any farther, a load must be applied to maintain the second spring 48 in this fully compressed position while the first spring 46 continues to deform. This load on the second spring 48 is represented by the broken line 109.

The first bladder 52 also moves in response to the compression load applied to the strut 10. The first bladder 52 moves against the gas pressure in the first gas chamber 54. The amount of deflection of the strut 10 in response to compression of the gas in the first gas chamber 54 is represented by line 114. At point 116 on line 114, the first bladder 52 cannot move any farther. Although the first bladder 52 cannot move any farther at point 116, a load must be applied to maintain the first bladder 52 in this position while the first spring 46 continues to deform. This load on the first bladder 52 is represented by the broken line 117.

Similarly, the second bladder 68 moves in response to the compression load applied to the strut 10. When fluid enters into the storage chamber 72, the second bladder 68 moves against the gas pressure in the second gas chamber 70. The amount of deflection of the strut 10 resulting from compression of the gas in the second gas chamber 70 is represented by line 118. At point 120 on line 118, the second bladder 68 cannot move any farther. This is because both springs 46, 48 are at their limits of travel as indicated by point 108 on line 104 and point 112 on line 110.

Line 124 is the composite of line 104, line 110, line 114, and line 118. Line 124 represents the load-deflection characteristics of the strut 10. At point 126 on line 124, the strut 10 is fully compressed. By combining the different spring rates as indicated by the different lines, a soft spring rate is provided which, in turn, provides for a more comfortable ride in the vehicle. Furthermore, the load carrying capacity of the vehicle is maximized.

This invention has been described above with reference to a preferred embodiment. Modifications and alterations may become apparent to one skilled in the art upon reading and understanding this specification. It is intended to include all such modifications and alterations within the scope of the appended claims.

Having described a preferred embodiment of the invention, I claim:

1. An apparatus for damping relative movement between parts, said apparatus comprising:
    an elastomeric spring assembly acting to resist relative movement between the parts;
    said elastomeric spring assembly comprising an elastomeric spring member defining at least partially a first fluid chamber for receiving electrorheological fluid;
    means defining a fluid storage chamber in fluid communication with said first fluid chamber;
    means for controlling fluid flow from said first fluid chamber to said fluid storage chamber to thereby control the spring rate of said elastomeric spring assembly, said controlling means comprising means for applying an electric field to a portion of said electrorheological fluid to control the viscosity thereof;
    sensor means for controlling said means for controlling fluid flow from said first fluid chamber to said fluid storage chamber;
    a cylinder connected with one of the parts and defining a working fluid chamber;
    a piston dividing said working fluid chamber into first and second chamber portions;
    a piston rod connected with said piston and with the other of the parts, said piston and piston rod being movable relative to said cylinder in compression and extension strokes, said elastomeric spring assembly acting to resist relative movement between said piston and said cylinder;
    means for communicating said first fluid chamber with said first chamber portion, means for communicating said first and second chamber portions, and means for communicating said second chamber portion with said fluid storage chamber;
    a second elastomeric spring assembly defining a second fluid chamber;
    means for connecting said first and second elastomeric springs to act in series; and
    means for communicating with second fluid chamber of said second elastomeric spring assembly with one of said first and second chamber portions.

2. A strut as defined in claim 1 wherein said means for communicating said first fluid chamber of said first elastomeric spring assembly with said first chamber portion comprises a passage in said piston rod, said means for communicating said first and second chamber portions comprises a passage in said piston, and said means for communicating said second chamber portion with said storage chamber includes a passage in said cylinder.

3. An apparatus as defined in claim 2 wherein each of said elastomeric spring assemblies includes an elastomeric spring and said means for connecting said elastomeric spring assemblies to act in series comprises a member encircling said piston and cylinder and connected at one end to the elastomeric spring of said first elastomeric spring assembly and connected at its other end to the elastomeric spring of said second elastomeric spring assembly, and means for supporting said member for sliding movement relative to said cylinder and said piston 4. Apparatus as defined in claim 3 wherein said first and second elastomeric springs have different spring rates and move overcenter upon movement of said piston and cylinder a predetermined amount in a compression stroke.

5. An apparatus as defined in claim 3 wherein said means for applying an electric field includes a plurality of conductive rings disposed at one end of said member encircling said piston and cylinder, said plurality of conductive rings being electrically connectable to one terminal of an electrical power source, said cylinder being electrically connected to the other terminal of the electrical power source, an electric field being applied to a portion of said electrorheological fluid to control the viscosity thereof when said plurality of conductive rings is electrically connected to the electrical power source in response to a condition sensed by said sensor means.

6. A strut for damping relative movement between parts, said strut comprising:
    first and second elastomeric springs acting to resist relative movement between said parts;
    said first and second elastomeric springs having different spring rates, said respective elastomeric springs define at least partially respective first and second fluid chambers;
    means connecting said first and second elastomeric springs to act in series; and
    a cylinder connected with one of the parts and with one of said elastomeric springs and defining a working fluid chamber in fluid communication with said first and second fluid chambers;
    a piston dividing said working fluid chamber into first and second working fluid chambers; and
    a piston rod connected with said piston and with the other of the parts and with the other of said elastomeric springs, said piston and said piston rod being movable relative to said cylinder in compression and extension strokes.

7. A strut as defined in claim 6 further including a flexible elastomeric membrane separating one of said first and second fluid chambers from a gas chamber for receiving a gaseous medium under pressure, said elastomeric membrane deforming against the pressure of the gas in said gas chamber when fluid flows into said one of said first and second fluid chambers.

8. A strut as defined in claim 6 wherein said first and second springs are ring-shaped and extend at an angle to the direction of relative movement of the parts, the inner diameter of one of said first and second springs being connected with one of the parts, the outer diameter of said one of said first and second springs being connected with the other of said parts, and said one of said first and second springs moving overcenter after a predetermined amount of movement of said parts toward each other.

9. A strut as defined in claim 8 wherein the other one of said first and second springs mOves over center after another predetermined amount of movement of said parts toward each other.

10. A strut as defined in claim 8 further including a fluid storage chamber with electrorheological fluid, said fluid storage chamber supported by said means connecting said first and second elastomeric springs and between said first and second elastomeric springs, means for providing fluid communication between said fluid storage chamber and said first and second fluid chambers, and means for controlling fluid flow from said first fluid chamber to said fluid storage chamber to thereby control the spring rate of said first elastomeric spring.

11. A strut as defined in claim 10 further including a flexible elastomeric membrane separating said fluid storage chamber from a gas chamber for receiving a gaseous medium under pressure, said elastomeric membrane deforming against the pressure of gas in said gas chamber when fluid flows into said fluid storage chamber.

12. A strut as defined in claim 10 further including sensor means for sensing a condition to be encountered by the parts for controlling said means for controlling fluid flow from said first fluid chamber to said fluid storage chamber, said sensor means including a sensor for sensing the condition of the road to be encountered by the parts.

13. A strut as defined in claim 12 wherein said means for controlling fluid flow includes a plurality of conductive rings disposed at one end of said means connecting said first and second elastomeric springs, said plurality of conductive rings being electrically connectable to one terminal of an electrical power source, said cylinder being electrically connected to the other terminal of the electrical power source, an electric field being applied to a portion of said electrorheological fluid to control the viscosity thereof when said plurality of conductive rings is electrically connected to the electrical power source in response to a condition sensed by said sensor means.

14. A suspension strut for damping relative movement between parts, said strut comprising:
    a cylinder connected with one of the parts and defining a working fluid chamber;
    a piston dividing said working fluid chamber into first and second chamber portions, said piston being connected with the other of the parts, said piston being movable relative to said cylinder in compression and extension strokes;
    first and second elastomeric spring assemblies acting to resist relative movement between said piston and said cylinder, each of said elastomeric spring assemblies comprising a respective elastomeric spring member defining at least partially a respective fluid chamber;
    means forming a chamber around said cylinder and a flexible elastomeric membrane dividing said chamber into a fluid storage chamber for receiving fluid therein and a gas chamber for receiving a gaseous medium under pressure; and
    means for providing fluid communication between fluid chambers defined by said elastomeric members and said fluid storage chamber.

15. A strut as defined in claim 14 further including another flexible elastomeric membrane separating one of said fluid chambers from another gas chamber for receiving a gaseous medium under pressure, said another elastomeric membrane deforming against the pressure of the gas in said another gas chamber when fluid flows into said one of said fluid chambers.

16. A strut as defined in claim 14 wherein said elastomeric spring members having different spring rates and moving overcenter upon movement of said piston and said cylinder a predetermined amount in a compression stroke.

17. A strut as defined in claim 14 further including means for controlling fluid flow from at least one of said fluid chambers associated with said elastomeric spring members to said fluid storage chambers to thereby control the spring rate of at least one of said elastomeric spring members.

18. A strut as defined in claim 17 further including sensor means for sensing a condition to be encountered by the parts for controlling said means for controlling fluid flow from said one fluid chamber to said fluid storage chamber, said sensor means including a sensor for sensing the condition of the road to be encountered by the parts.

19. An apparatus for damping relative movement between parts, said apparatus comprising:
a cylinder connected with one of the parts and defining a working fluid chamber;
a piston connected with another one of the parts and dividing said working fluid chamber into first and second chamber portion connected in fluid communication with each other, said piston being movable relative to said cylinder in compression and extension strokes;
an elastomeric spring assembly acting to resist relative movement between said piston and said cylinder;
said elastomeric spring assembly including an elastomeric spring member defining at least partially a first fluid chamber;
means defining a fluid storage chamber;
first passage means for communicating said first fluid chamber, said fluid storage chamber, and said first and second chamber portions, at least some fluid flowing between said first fluid chamber and said fluid storage chamber and through said first passage means upon relative movement between said piston and said cylinder;
second passage means for communicating said first fluid chamber and said fluid storage chamber, at least some fluid flowing between said first fluid chamber and said fluid storage chamber and through said second passage means upon relative movement between said piston and said cylinder; and
control means for controlling fluid flow through said second passage means between said first fluid chamber and said fluid storage chamber to control the spring rate of said elastomeric spring assembly, the damping of the relative movement between the parts varying as a function of the spring rate of said elastomeric spring assembly and as a function of the rate of fluid flow between said first fluid chamber and said fluid storage chamber through said first and second passage means.

20. An apparatus as defined in claim 19 wherein said first fluid is for electrorheological fluid, and said control means for controlling fluid flow between said first fluid chamber and said fluid storage chamber includes means for applying an electrorheological fluid to control the viscosity thereof to thereby control the fluid flow between said first fluid chamber and said fluid storage chamber whereby the spring rate of said elastomeric spring assembly is controlled.

21. An apparatus as defined in claim 19 further including a flexible membrane separating said first fluid chamber from a gas chamber for receiving a gaseous medium under pressure, said elastomeric membrane deforming against the pressure in said gas chamber when fluid flows into said first fluid chamber.

22. An apparatus as defined in claim 19 wherein the apparatus is a shock absorber for a vehicle for damping relative movement between a vehicle frame and vehicle wheels, the shock absorber having one portion connectable to the vehicle frame and another portion connectable to the vehicle wheels, said elastomeric spring assembly acting to resist relative movement between the vehicle frame and the vehicle wheels.

23. An apparatus as defined in claim 22 further including sensor means for sensing road bumps and chuckholes and for controlling said control means for controlling fluid flow through said second passage means between said first fluid chamber and said fluid storage chamber to thereby control the spring rate of said elastomeric spring assembly.

* * * * *